United States Patent
Hwang et al.

(10) Patent No.: US 12,540,142 B2
(45) Date of Patent: Feb. 3, 2026

(54) METHOD FOR EVALUATING QUALITY OF (3S)-3-(4-(3-(1,4-DIOXASPIRO[4,5]DEC-7-EN-8-YL)BENZYLOXY)PHENYL)HEX-4-INOIC ACID

(71) Applicant: Hyundai Pharm Co., Ltd., Cheonan-si (KR)

(72) Inventors: Jeong Un Hwang, Suwon-si (KR); Kyu Hwan Lee, Yongin-si (KR); Eun Young Kim, Hwaseong-si (KR); Su Kyoung Choi, Suwon-si (KR)

(73) Assignee: Hyundai Pharm Co., Ltd., Cheonan-si (KR)

( * ) Notice: Subject to any disclaimer, the term of this patent is extended or adjusted under 35 U.S.C. 154(b) by 857 days.

(21) Appl. No.: 17/759,305

(22) PCT Filed: Jan. 29, 2021

(86) PCT No.: PCT/KR2021/001191
§ 371 (c)(1),
(2) Date: Jan. 9, 2023

(87) PCT Pub. No.: WO2021/154019
PCT Pub. Date: Aug. 5, 2021

(65) Prior Publication Data
US 2023/0227465 A1    Jul. 20, 2023

(30) Foreign Application Priority Data
Jan. 31, 2020  (KR) .................. 10-2020-0012027

(51) Int. Cl.
| | | |
|---|---|---|
| C07D 493/10 | (2006.01) | |
| G01N 30/88 | (2006.01) | |
| G01N 30/04 | (2006.01) | |

(52) U.S. Cl.
CPC .......... C07D 493/10 (2013.01); G01N 30/88 (2013.01); *G01N 2030/045* (2013.01); *G01N 2030/884* (2013.01)

(58) Field of Classification Search
CPC .................................................. C07D 493/10
See application file for complete search history.

(56) References Cited

U.S. PATENT DOCUMENTS

| | | |
|---|---|---|
| 6,333,198 B1 | 12/2001 | Edmeades et al. |
| 9,969,723 B2 | 5/2018 | Yang et al. |
| 10,821,110 B2 | 11/2020 | Yang et al. |

FOREIGN PATENT DOCUMENTS

| | | |
|---|---|---|
| KR | 20000005611 A | 1/2000 |
| KR | 101569522 B1 | 11/2015 |
| KR | 20160108315 A | 9/2016 |
| KR | 101728900 B1 | 4/2017 |
| KR | 20190141007 A | 12/2019 |
| WO | 2015074025 A1 | 5/2015 |
| WO | 2019108046 A1 | 6/2019 |

OTHER PUBLICATIONS

English translation of International Search Report corresponding to International Patent Application No. PCT/KR2021/001191 (3 pages) (mailed Jun. 18, 2021).

Snyder et al. "Introduction to Modern Liquid Chromatography" Second Edition, 881 pages (1979).

Strobel et al. "Chemical Instrumentation: A Systematic Approach" 3rd Edition, 1248 pages (1989) (Abstract only).

*Primary Examiner* — John S Kenyon
(74) *Attorney, Agent, or Firm* — Myers Bigel, P.A.

(57) ABSTRACT

The present invention provides a related substance of (3S)-3-(4-(3-(1,4-dioxaspiro[4,5]dec-7-en-8-yl)benzyloxy)phenyl)hex-4-inoic acid, and a method for evaluating the quality of (3S)-3-(4-(3-(1,4-dioxaspiro[4,5]dec-7-en yl)benzyloxy)phenyl)hex-4-inoic acid using the same. According to the present invention, it is possible to evaluate the quality, stability and the like of a pharmaceutical composition comprising (3S)-3-(4-(3-(1,4-dioxaspiro[4,5]dec-7-en-8-yl)benzyloxy)phenyl)hex-4-inoic acid using a compound of Chemical Formula 2 or a salt thereof as a reference standard.

8 Claims, 4 Drawing Sheets

METHOD FOR EVALUATING QUALITY OF (3S)-3-(4-(3-(1,4-DIOXASPIRO[4,5]DEC-7-EN-8-YL)BENZYLOXY)PHENYL)HEX-4-INOIC ACID

TECHNICAL FIELD

The present invention relates to a related substance of (3S)-3-(4-(3-(1,4-dioxaspiro[4,5]dec-7-en-8-yl)benzyloxy)phenyl)hex-4-inoic acid, and a method for evaluating the quality of (3S)-3-(4-(3-(1,4-dioxaspiro[4,5]dec-7-en-8-yl)benzyloxy)phenyl)hex-4-inoic acid using the same.

BACKGROUND ART

A compound of the following Chemical Formula 1, that is, (3S)-3-(4-(3-(1,4-dioxaspiro[4,5]dec-7-en-8-yl)benzyloxy)phenyl)hex-4-inoic acid is a drug developed as a therapeutic agent for metabolic diseases (Patent Document 1, Korean Patent No. 10-1569522; Patent Document 2, Korean Patent No. 10-1728900).

[Chemical Formula 1]

Although it is preferred that an active pharmaceutical ingredient ("API") is prepared in high purity, it is very rare when the mixture of reaction products is a pure single compound in a process of preparing the active pharmaceutical ingredient, and a mixture of reaction products includes impurities such as reaction by-products and reagents used in the reaction. Further, since the active pharmaceutical ingredient may be modified even during the formulation process or the storage process of a formulation, a part of the active pharmaceutical ingredient may be decomposed or modified, and thus become an impurity. Therefore, the content of an active pharmaceutical ingredient present in a pharmaceutical product needs to be measured during the preparation, storage and use of an active pharmaceutical ingredient or drug substance or a finished pharmaceutical product, and the purity of an active pharmaceutical ingredient is usually analyzed by high-performance liquid chromatography (HPLC) or gas chromatography (GC) analysis. An impurity included in pharmaceutical products is also called a related impurity or related substance, and it is also essential for quality control of pharmaceutical products to analyze the presence or absence of related substances with a content above the standard value (for example, 0.1% or more).

Impurities are associated with a peak position in a chromatogram (spots on thin-layer chromatography (TLC) plates) (Strobel p. 953) (Strobel, H. A.; Heineman, W. R., Chemical Instrumentation: A Systematic approach, 3Rd dd. (Wiley & Sons: New York 1989)).

Therefore, the impurity may be identified by its position in the chromatogram, which is typically measured within the time of several minutes between the injection of a sample on the column and the elution of a specific ingredient through a detector, known as "retention time". The time period varies daily based on the condition of the equipment and many other factors. To mitigate the effect that such variations have upon accurate identification of an impurity, those skilled in the art identify impurities using "relative retention time" (RRT) (Strobel p. 922). The RRT of an impurity is the retention time of the impurity divided by the retention time of any reference standard. Theoretically, the active pharmaceutical ingredient itself may be used as a reference standard, but it tends to be present in a mixture in an excessive proportion as a substantial substance and saturate the column, resulting in an irreproducible retention time. Therefore, it is sometimes preferred that the active pharmaceutical ingredient is added or present in a sufficiently significant amount to be detectable, or an alternative compound with a content low enough not to saturate the column is selected and such a compound is used as a reference standard.

Researchers and developers of drug manufacturing understand that a compound in a relatively pure state can be used as a "reference standard" to quantify the amount of a compound in an unknown mixture. When the compound is used as an "external standard", a solution of a known concentration of the compound is analyzed by the same technique as the unknown mixture (Strobel p. 924, Snyder p. 549) (Snyder, L. R.; Kirkland, J. J. Introduction to Modern Liquid Chromatography, 2nd edition (John Wiley &Sons: New York 1979)). The amount of the compound in the mixture may be determined by comparing the magnitude of the detector response.

The reference standard compound may also be used to quantify the amount of another compound in the mixture when a "response factor", which compensates for differences in the sensitivity of the detector to the two compounds, has been predetermined (Strobel p. 894). For this purpose, the reference standard compound is added directly to the mixture, and is referred to as an "internal standard" (Strobel p. 925, Snyder p. 552).

The reference standard compound may be used as an internal standard when an unknown mixture includes some reference standard compound using a technique known as "standard addition", and here, at least two samples are prepared by adding known and differing amounts of the internal standard (Strobel pp. 391-393, Snyder pp. 571,572). The proportion of the detector response due to the reference standard compound originally present in the mixture may be determined by plotting the detector response against the amount of the reference standard compound added to each of the samples, and extrapolating the plot to zero concentration of the reference standard (for example, Strobel, FIG. 11.4, p. 392).

RELATED ART DOCUMENTS

Patent Documents (Patent Document 1) Korean Patent No. 10-1569522
(Patent Document 2) Korean Patent No. 10-1728900

Non-Patent Documents (Non-Patent Document 1) Strobel, H. A.; Heineman, W. R., Chemical Instrumentation: A Systematic approach, 3Rd dd. (Wiley & Sons: New York 1989)
(Non-Patent Document 2) Snyder, L. R.; Kirkland, J. J. Introduction to Modern Liquid Chromatography, 2nd edition (John Wiley &Sons: New York 1979)

NATIONAL RESEARCH AND DEVELOPMENT PROJECT SUPPORTING PRESENT INVENTION

[Project No.] HI17C2529
[Ministry Name] Ministry of Health and Welfare
[Research Management Specialist Agency] Korea Health Industry Development Institute
[Research Title] Development of advanced medical technology
[Research Project Title] (Clinical phase 1) Development of potent (EC50<1 nM) diabetes treatment agent HD-6277 with breakthrough hypoglycemic effect (HbA1c>1%) and no hypoglycemic side effect
[Contribution Rate] 1/1
[Managing Department] Hyundai Pharmaceutical Co., Ltd.
[Research Term] Dec. 12, 2017 to Jun. 30, 2020

DISCLOSURE

Technical Problem

The present invention has been made in an effort to provide a related substance of (3S)-3-(4-(3-(1,4-dioxaspiro[4,5]dec-7-en-8-yl)benzyloxy)phenyl)hex-4-inoic acid, and a method for evaluating the quality of (3S)-3-(4-(3-(1,4-dioxaspiro[4,5]dec-7-en-8-yl)benzyloxy)phenyl)hex-4-inoic acid using the same.

Technical Solution

The present invention provides a compound of the following Chemical Formula 2, which is a related substance of (3S)-3-(4-(3-(1,4-dioxaspiro[4,5]dec-7-en-8-yl)benzyloxy)phenyl)hex-4-inoic acid or a salt thereof.

[Chemical Formula 2]

As used herein, the term "reference standard" refers to a compound that can be used for both quantitative and qualitative analysis of an active pharmaceutical ingredient. For example, in HPLC, the retention time of a compound allows the setting of relative retention time, enabling qualitative analysis. The concentration of the compound in solution prior to being injected into the HPLC column allows comparison of the area under the peak of the HPLC chromatogram, enabling quantitative analysis.

Although some with knowledge in the art generally describe the reference standard in this regard, the person skilled in the art may understand that the detector response may be a peak height or integrated peak area of a chromatogram of the eluent of HPLC by ultra violet (UV) or refractive index detection, or, for example, from the eluent of GC by flame ionization detection or thermal conductivity detection, or from the eluent of spots on fluorescent TLC plates by other detector responses, for example, UV absorption. The position of the reference standard may be used to calculate the relative retention time for (3S)-3-(4-(3-(1,4-dioxaspiro[4,5]dec-7-en-8-yl)benzyloxy)phenyl)hex-4-inoic acid and other impurities.

When (3S)-3-(4-(3-(1,4-dioxaspiro[4,5]dec-7-en-8-yl)benzyloxy)phenyl)hex-4-inoic acid is exposed to stress conditions using light or acid, temperature, humidity, and the like, a related substance of (3S)-3-(4-(3-(1,4-dioxaspiro[4,5]dec-7-en yl)benzyloxy)phenyl)hex-4-inoic acid is obtained, and the related substance may be used as a reference standard.

By applying stress in the process of synthesizing (3S)-3-(4-(3-(1,4-dioxaspiro[4,5] dec-7-en-8-yl)benzyloxy)phenyl)hex-4-inoic acid through the following Example 1, the present inventors obtained a related substance thereof, and as a result of HPLC and mass spectrometry, the present inventors confirmed that the related substance is a compound of the following Chemical Formula 2.

[Chemical Formula 2]

The compound of Chemical Formula 2 may be prepared through chemical synthesis for use as a reference standard. Although not limited thereto, the compound of Chemical Formula 2 may be obtained, for example, through the process of the following Reaction Scheme 1.

[Reaction Scheme 1]

A specific synthesis method includes the following steps.

<Step 1> Synthesis of (3-(7-oxaspiro[bicyclo[4.1.0] heptane-3,2'-[1,3]dioxolan]-6-yl)phenyl)methanol (7-oxaspiro[bicyclo[4.1.0]heptane-3,2'-[1,3]dioxolan]-6-yl)phenyl)methanol is synthesized by epoxidizing (3-(1,4-dioxaspiro[4.5]dec-7-en-8-yl)phenyl)methanol.

<Step 2> Synthesis of 3-(7-oxaspiro[bicyclo[4.1.0] heptane-3,2'-[1,3]dioxolan]-6-yl)benzyl methanesulfonate 3-(7-oxaspiro[bicyclo[4.1.0]heptane-3,2-[1,3]dioxolan]-6-yl)benzyl methanesulfonate is synthesized by mesylating (3-(7-oxaspiro[bicyclo[4.1.0]heptane-3,2'-[1,3]dioxolan]-6-yl)phenyl)methanol.

<Step 3> Synthesis of (3S)-ethyl 3-(4-((3-(7-oxaspiro[bicyclo[4.1.0]heptane-3,2'-[1,3]dioxolan]-6-yl)benzyl)oxy)phenyl)hex-4-inoate (3S)-ethyl 3-(4-(3-(7-oxaspiro[bicyclo[4.1.0]heptane-3,2'-[1,3]dioxolan]-6-yl)benzyl)oxy)phenyl)hex-4-inoate is obtained by reacting 3-(7-oxaspiro[bicyclo[4.1.0]heptane-3,2'-[1,3]dioxolan]-6-yl)benzyl methanesulfonate with (S)-ethyl 3-(4-hydroxyphenyl)hex-4-inoate.

<Step 4> Synthesis of (3S)-3-(4-((3-(7-oxaspiro[bicyclo[4.1.0]heptane-3,2'-[1,3]dioxolan]-6-yl)benzyl)oxy)phenyl)hex-4-inoic acid (3S)-3-(4-(3-(7-oxaspiro[bicyclo[4.1.0]heptane-3,2'-[1,3]dioxolan]-6-yl)benzyl)oxy)phenyl)hex-4-inoic acid is obtained by hydrolyzing (3S)-ethyl 3-(4-((3-(7-oxaspiro[bicyclo[4.1.0]heptane-3,2'-[1,3]dioxolan] yl)benzyl)oxy)phenyl)hex-4-inoate.

The compound of Chemical Formula 2 may be used in the form of a salt. (3S)-3-(4-(3-(1,4-dioxaspiro[4,5] dec-7-en-8-yl)benzyloxy)phenyl)hex-4-inoic acid may be included in the form of a pharmaceutically acceptable salt in a pharmaceutical product. Therefore, the compound of Chemical Formula 2, which is a related substance of (3S)-3-(4-(3-(1,4-dioxaspiro[4,5]dec-7-en-8-yl)benzyloxy)phenyl)hex-4-inoic acid can also be used in the form of a salt that is equivalent to a pharmaceutically acceptable salt of (3S)-3-(4-(3-(1,4-dioxaspiro[4,5]dec-7-en-8-yl)benzyloxy)phenyl)hex-4-inoic acid (see Patent Document 1, Korean Patent No. 10-1569522). For example, the compound of Chemical Formula 2 can be used in the form of a pharmaceutically acceptable metal salt or amino acid salt when used as the reference standard. For example, the metal salt includes sodium, potassium or calcium salt, and the amino acid salt includes, for example, a natural amino acid salt such as glycine, alanine, phenylalanine, valine, lysine, and glutamic acid salt.

In one exemplary embodiment, the present invention provides a composition for evaluating a pharmaceutical product including (3S)-3-(4-(3-(1,4-dioxaspiro[4,5]dec-7-en-8-yl)benzyloxy)phenyl)hex-4-inoic acid, including a compound of the following Chemical Formula 2 or a salt thereof.

[Chemical Formula 2]

As described above, the compound of Chemical Formula 2 or a salt thereof may be used as a reference standard for evaluating the quality of an active pharmaceutical ingredient or drug substance or a pharmaceutical product, which includes (3S)-3-(4-(3-(1,4-dioxaspiro[4,5] dec-7-en-8-yl) benzyloxy) phenyl)hex inoic acid. In other words, the compound of Chemical Formula 2 or a salt thereof may be used as a reference standard for evaluating the purity, storage stability or the like of a pharmaceutical product in the process of preparing the pharmaceutical product by analyzing the content of (3S)-3-(4-(3-(1,4-dioxaspiro[4,5]dec-7-en-8-yl)benzyloxy)phenyl)hex-4-inoic acid or a related substance thereof in the pharmaceutical product.

The present invention also provides a method for evaluating the quality of a pharmaceutical product including (3S)-3-(4-(3-(1,4-dioxaspiro[4,5]dec-7-en-8-yl)benzyloxy) phenyl)hex-4-inoic acid, the method including evaluating the content of (3S)-3-(4-(3-(1,4-dioxaspiro[4,5]dec-7-en-8-yl)benzyloxy)phenyl)hex-4-inoic acid in the pharmaceutical product using a compound of the following Chemical Formula 2 or a salt thereof as a reference standard.

A method of analyzing the content of (3S)-3-(4-(3-(1,4-dioxaspiro[4,5]dec en-8-yl)benzyloxy)phenyl)hex-4-inoic acid in a pharmaceutical product or an active pharmaceutical ingredient or drug substance using the compound of Chemical Formula 2 or a salt thereof is not particularly limited, and a known method for analyzing a substance in a composition may be used.

For example, HPLC may be used for the analysis method. In addition, the analysis method may additionally include a step of qualitative analysis of the substance by liquid chromatography/mass spectrometry (LC/MS), liquid chromatography/tandem mass spectrometry (LC/MS/MS), nuclear magnetic resonance (NMR), or one or more thereof.

For example, when a sample is analyzed using HPLC, an electrical signal emitted from a detector is used to draw a peak with the X-axis as the time and the Y-axis as the signal magnitude. Relative results with respect to the concentration may be obtained with the peak height, area and the like of the separated substance. The X-axis time (RT: retention time) is a qualitative factor compared to the reference standard that is conventionally known, and the peak area (peak area, peak height) with the Y-axis as the height and the X-axis of the peak as the base line is a qualitative factor. The purity (Area %) is calculated by the area value of each peak of the total sum of the detected peak areas.

In the method for evaluating the quality of a pharmaceutical product, the target of content evaluation is not necessarily limited to the active ingredient. For example, the content of other related substances included in addition to the active ingredient may also be analyzed using the compound of Chemical Formula 2 or a salt thereof as a reference standard.

Therefore, the present invention also provides a method for evaluating the quality of a pharmaceutical product including (3S)-3-(4-(3-(1,4-dioxaspiro[4,5]dec-7-en-8-yl) benzyloxy)phenyl)hex-4-inoic acid, the method including evaluating the content of a related substance in the pharmaceutical product using a compound of the following Chemical Formula 2 or a salt thereof as a reference standard.

In one exemplary embodiment, when the content of the related substance is less than 0.5% during the storage of the pharmaceutical product under long-term storage conditions (5° C.±3° C. for 36 months), it is determined to have met the quality criteria.

In another exemplary embodiment, when the content of the related substance is less than 0.5% during the storage of the pharmaceutical product under long-term storage conditions (25° C.±2° C.±5% RH) for 36 months, it is determined to have met the quality criteria.

In still another exemplary embodiment, when the content of the related substance is less than 0.5% during the storage of the pharmaceutical product under accelerated storage conditions (40° C.±2° C.±5% RH) for 24 months, it is determined to have met the quality criteria.

In one exemplary embodiment, the present invention provides a method for analyzing a sample including (3S)-3-(4-(3-(1,4-dioxaspiro[4,5]dec-7-en-8-yl)benzyloxy)phenyl)hex-4-inoic acid, the method including:
a) obtaining data by subjecting a sample to chromatography; and
b) comparing the data with the chromatography data of a compound of the following Chemical Formula 2 or a salt thereof.

[Chemical Formula 2]

For example, the method may include:
(a) obtaining a chromatogram by subjecting a solution of (3S)-3-(4-(3-(1,4-dioxaspiro[4,5]dec-7-en-8-yl)benzyloxy)phenyl)hex-4-inoic acid including the compound of Chemical Formula 2 or a salt thereof to high-performance liquid chromatography; and
(b) comparing a peak obtained from the chromatogram with a peak produced from the compound of Chemical Formula 2 or a salt thereof.

Alternatively, the method may include:
(a) obtaining a chromatogram by subjecting a solution of (3S)-3-(4-(3-(1,4-dioxaspiro[4,5]dec-7-en-8-yl)benzyloxy)phenyl)hex-4-inoic acid to thin layer chromatography; and
(b) comparing a spot obtained from the chromatogram with a spot produced from the compound of Chemical Formula 2 or a salt thereof.

Furthermore, the present invention provides a method for measuring the chromatography column retention time for (3S)-3-(4-(3-(1,4-dioxaspiro[4,5]dec-7-en-8-yl)benzyloxy)phenyl)hex-4-inoic acid, the method including:
performing chromatography using a compound of the following Chemical Formula 2 or a salt thereof as a reference standard.

[Chemical Formula 2]

Advantageous Effects

According to the present invention, it is possible to evaluate the quality, stability and the like of a pharmaceutical composition including (3S)-3-(4-(3-(1,4-dioxaspiro[4,5]dec-7-en-8-yl)benzyloxy)phenyl)hex-4-inoic acid using a compound of Chemical Formula 2 or a salt thereof as a reference standard.

MODES OF THE INVENTION

Hereinafter, the present invention will be described in more detail through examples, but this is for the purpose of describing the present invention, and the scope of the present invention is not limited by any way by the examples.

EXAMPLES

Example 1: Separation of Related Substance

About 35 mg of a (3S)-3-(4-(3-(1,4-dioxaspiro[4,5]dec-7-en yl)benzyloxy)phenyl)hex-4-inoic acid-containing substance stored under refrigerated conditions (5° C.±3° C.) for about 2 years was accurately weighed and put into a 50-ml volume flask, a diluent was added to the flask at about ⅔ of the volume, and the resulting mixture was mixed well. Thereafter, a related substance was analyzed using HPLC (Agilent Technologies 1200 Series).

<HPLC conditions> Operation Parameters
Column: Kinetex EVO C18, 5 um, 4.6×250 mm
Column temperature: 25° C.
Flow rate: 1.0 ml/min
Injection volume: 5 μl
Sample concentration: 0.7 mg/ml
Wavelength: 220 nm
Mobile Phase A: 0.01 M $K_2HPO_4$ (pH 7)
Mobile Phase B: AN
Diluent: $H_2O$/AN (80/20)
Gradient:

| Time (min) | Mobile phase A (%) | Mobile phase B (%) |
|---|---|---|
| 0 | 80 | 20 |
| 7 | 80 | 20 |
| 50 | 30 | 70 |
| 55 | 30 | 70 |
| 55.10 | 80 | 20 |
| 62 | 80 | 20 |

Analysis results are shown below.

| Peak Number | Retention Time | Area | Area % | Name |
|---|---|---|---|---|
| 1 | 6.953 | 40106 | 0.0035 | |
| 2 | 13.560 | 50730 | 0.0044 | |
| 3 | 15.907 | 121406 | 0.0106 | |
| 4 | 16.740 | 81372 | 0.0071 | |
| 5 | 17.647 | 72507 | 0.0063 | |

-continued

| Peak Number | Retention Time | Area | Area % | Name |
|---|---|---|---|---|
| 6 | 18.127 | 171612 | 0.0150 | |
| 7 | 18.407 | 72715 | 0.0063 | |
| 8 | 19.387 | 450501 | 0.0393 | |
| 9 | 19.613 | 347157 | 0.0303 | |
| 10 | 19.840 | 85581 | 0.0075 | |
| 11 | 20.373 | 121471 | 0.0106 | |
| 12 | 20.740 | 74147 | 0.0065 | |
| 13 | 21.033 | 80418 | 0.0070 | |
| 14 | 21.220 | 195488 | 0.0171 | |
| 15 | 21.827 | 286792 | 0.0250 | |
| 16 | 22.493 | 160952 | 0.0141 | |
| 17 | 22.573 | 289110 | 0.0252 | |
| 18 | 22.967 | 143309 | 0.0125 | |
| 19 | 23.047 | 310852 | 0.0271 | |
| 20 | 23.580 | 2939436 | 0.2566 ← | |
| 21 | 24.107 | 111999 | 0.0098 | |
| 22 | 25.167 | 119138 | 0.0104 | |
| 23 | 25.347 | 1133145719 | 98.9289 | Chemical Formula 1 |
| 24 | 26.767 | 872290 | 0.0762 | |
| 25 | 27.980 | 47225 | 0.0041 | |
| 26 | 31.740 | 166640 | 0.0145 | |
| 27 | 35.560 | 4718016 | 0.4119 | |
| 28 | 39.353 | 137539 | 0.0120 | |
| Totals | | 1145414228 | 100.0000 | |

A substance containing the related substance (RRT: 0.93, Area % 0.26%) analyzed by HPLC was qualitatively analyzed by MS scan and production ion scan using a Q-TOF-LC/MS system. The LC-MS/MS system qualitatively analyzes the substance using an Agilent 1290 Infinity HPLC system and an Agilent 6550 Q-TOF mass spectrometer. Analysis conditions are as follows.

<HPLC Conditions>

Column: YMC-Pack Pro C18 column (4.6×150 mm, 5 μm) equipped with Phenomenex SecurityGuard C18 guard column (4×20 mm)

Mobile Phase A: 0.1% formic acid in H2O/MeOH=60/40
Mobile Phase B: 0.1% formic acid in acetonitrile/MeOH=60/40
Flow rate: 1 ml/min (over 34 min)
Injection volume: 10 μl
Diluent: H₂O/ACN=10/90

| Time (min) | Mobile phase A % | Mobile phase B % |
|---|---|---|
| 0 | 80% | 20% |
| 0-23 | 80-10% | 20-90% |
| 23-28 | 10% | 90% |
| 28-29 | 10-80% | 90-20% |
| 29-34 | 80% | 20% |

Wavelength: 220 (or 260 nm)

<Mass Spectrometer Conditions>

Capillary voltage: 3500 V
Ionization: Electrospray Ionization, Positive (ESI+)
Drying gas: 14
Nebulizer gas: 50
Sheath gas: 12
Sheath gas temperature: 400° C.
Drying gas temperature: 250° C.
Full scan MS, MS/MS mode: (m/z 100 to 1000)

An analyte separated in the detection step was set to flow into the mass spectrometer, and in this case, the detected ion of the related substance was qualitatively analyzed by selecting the characteristic ion [M+Na] of the mass spectrum.

As a result of the analysis, three predicted compounds were derived, and each predicted compound was synthesized and subjected to MS analysis. As a result, it was confirmed that the chemical structure of a related substance represented by RRT 0.93 has the structure of the following Chemical Formula 2.

[Chemical Formula 2]

(3S)-3-(4-((3-(7-oxaspiro[bicyclo[4.1.0]heptane-3,2'-[1,3]dioxolan]-6-yl)benzyl)oxy)phenyl)hex-4-inoic acid Example 2. Synthesis of Chemical Formula 2

The compound of Chemical Formula 2 was synthesized as follows according to the following Reaction Scheme 1.

[Reaction Scheme 1]

<Step 1> Synthesis of (3-(7-oxaspiro[bicyclo[4.1.0]heptane-3,2'-[1,3]dioxolan]-6-yl)phenyl)methanol

Meta-chloroperoxybenzoic acid (MCPBA) (365.40 mmol) was added to a flask and dissolved in ethyl acetate (450 ml). The internal temperature was cooled to 0° C. while stirring. (3-(1,4-Dioxaspiro[4.5]dec-7-en-8-yl)phenyl)methanol (DS-PMA)(30 g, 121.80 mmol) was dissolved in ethyl acetate (150 ml) and the resulting solution was added thereto at 0° C. After the addition, the mixture was stirred at room temperature and then checked with TLC to confirm that the reaction was completed. The reaction product was washed with a 1 N aqueous sodium hydroxide solution (300 ml×3) and purified water (300 ml×2). The organic layer was dried over anhydrous magnesium sulfate, and then filtered, and concentrated under reduced pressure. The organic layer was separated by silica column chromatography (ethyl acetate:n-hexane=1:2→ethyl acetate:n-hexane=1:1) and concentrated under reduced pressure to obtain a solid compound.

<Step 2> Synthesis of 3-(7-oxaspiro[bicyclo[4.1.0]heptane-3,2'-[1,3]dioxolan]-6-yl)benzyl methanesulfonate After (3-(7-oxaspiro[bicyclo[4.1.0]heptane-3,2'-[1,3]di-oxolan]-6-yl)phenyl)methanol (4.25 g, 16.20 mmol) was dissolved in ethyl acetate (42.5 ml), triethylamine (3.38 ml, 24.30 mmol) was added thereto at room temperature. The temperature was lowered while stirring for 30 minutes, and mesyl chloride (1.63 ml, 21.06 mmol) was slowly added dropwise thereto at 0° C. The resulting mixture was stirred at 5° C. It was confirmed by TLC that the reaction was completed. Purified water (42.5 ml) was added thereto at 5° C. and the resulting mixture was stirred. The organic layer was extracted, and then washed with purified water (42.5 ml). The organic layer was dried over anhydrous magnesium sulfate (50 g) and filtered to perform the next reaction without concentration.

<Step 3> Synthesis of (3S)-ethyl 3-(4((3-(7-oxas-piro[bicyclo[4.1.0]heptane-3,2'-[1,3]dioxolan]-6-yl)benzyl)oxy)phenyl)hex-4-inoate -continued A mesylated substance was calculated at a yield of 100%, and the $S_N2$ reaction was performed using 5.51 g of the substance.

3-(7-oxaspiro[bicyclo[4.1.0]heptane-3,2'-[1,3]dioxolan]-6-yl)benzyl methanesulfonate (5.51 g, 16.20 mmol), (S)-ethyl 3-(4-hydroxyphenyl)hex-4-inoate (3.57 g, 15.39 mmol) was put into a flask, and dissolved in acetonitrile (64 ml). After potassium phosphate tribasic (212.27 g, 32.405 mmol) was added thereto at room temperature, the mixture was stirred for 1 hour and 30 minutes while heating at 74 to 76° C. After it was confirmed by TLC that the reaction was completed, the temperature was lowered to room temperature. Purified water (30 ml) and ethyl acetate (30 ml) were added thereto, the resulting mixture was stirred, and then the organic layer and the aqueous layer were separated. The organic layer was washed twice with a 5% aqueous sodium chloride solution. The organic layer was dried over anhydrous magnesium sulfate and filtered. The filtered organic layer was concentrated under reduced pressure to obtain a solid compound.

<Step 4> Synthesis of (3S)-3-(4-((3-(7-oxaspiro[bicyclo[4.1.0]heptane-3,2'-[1,3]dioxolan]-6-yl)ben-zyl)oxy)phenyl)hex-4-inoic acid The yield was calculated to be 100% at the $S_N2$ reaction step, and a hydrolysis reaction was performed using 7.11 g of the solid compound.

Tetrahydrofuran (36 ml) and methanol (36 ml) were added to (3S)-ethyl 3-(4-((3-(7-oxaspiro[bicyclo[4.1.0]heptane-3,2'-[1,3]dioxolan]-6-yl)benzyl)oxy)phenyl) hex-4-inoate (7.11 g, 14.92 mmol) and the resulting mixture was stirred. Potassium hydroxide (4.92 g, 74.59 mmol) was dissolved in purified water (36 ml), the resulting solution was added thereto, and the resulting mixture was stirred at 30° C. for 30 minutes. After it was confirmed by TLC that the reaction was completed, the resulting product was concentrated under highly reduced pressure. Purified water was added thereto, the resulting mixture was stirred, and then the aqueous layer was washed twice with ethyl acetate. After the internal temperature was cooled to 0 to 5° C., the organic layer was extracted by acidifying with a 2 N aqueous hydrochloric acid solution. The organic layer was washed twice with a 5% aqueous sodium chloride solution, dried using anhydrous magnesium sulfate, and then concentrated under reduced pressure to obtain a compound.

The synthesized substance was confirmed by HPLC and mass spectrometry, and it was confirmed that the substance had the structure of Chemical Formula 2. In addition, the NMR and IR spectra of this substance were analyzed. The analysis results of 1HNMR, 13CNMR and IR (FIG. 1) are shown below.

Figure 1:
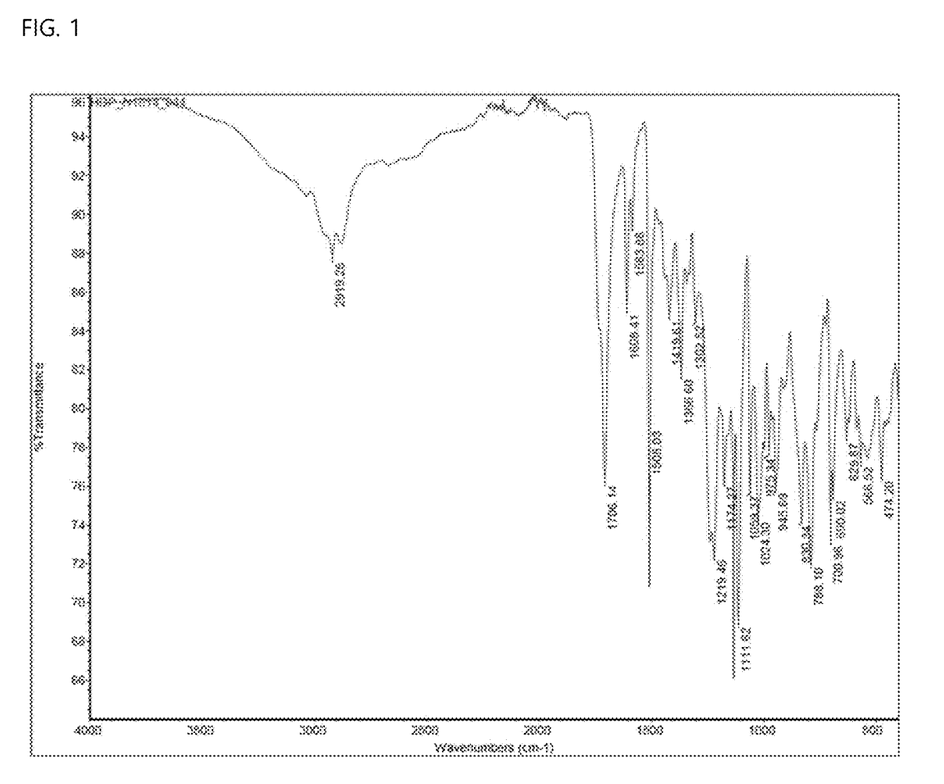
FIG. 1 illustrates IR data of a compound of Chemical Formula 2.

1H NMR (300 MHz, DMSO-d6): 12.27 (br, 1H), 7.43 (1H), 7.37 (1H), 7.32-7.27 (m, 3H), 6.96 (d, 2H), 5.09 (s, 1H), 3.95-3.81 (m, 5H), 3.12 (d, 1H), 2.61-2.51 (m, 3H), 2.16 (t, 2H), 2.01 (d, 1H), 1.79 (s, 3H), 1.68-1.56 (m, 2H)

Figure 2:
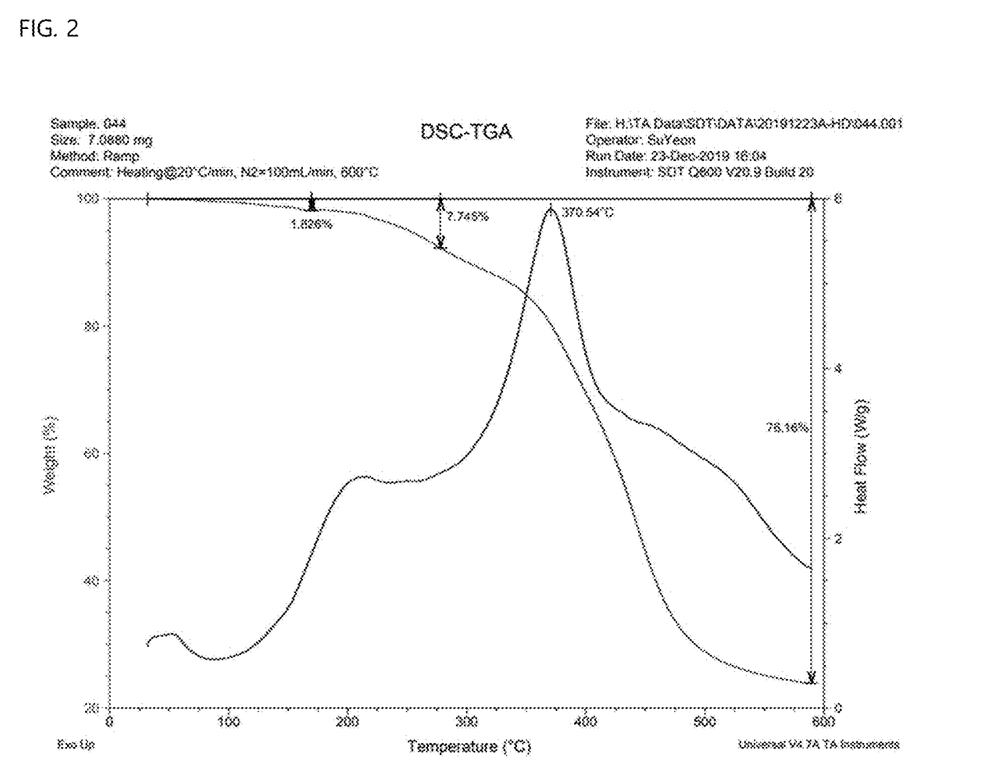
FIG. 2 illustrates DSC-TGA data of the compound of Chemical Formula 2.
Figure 3:
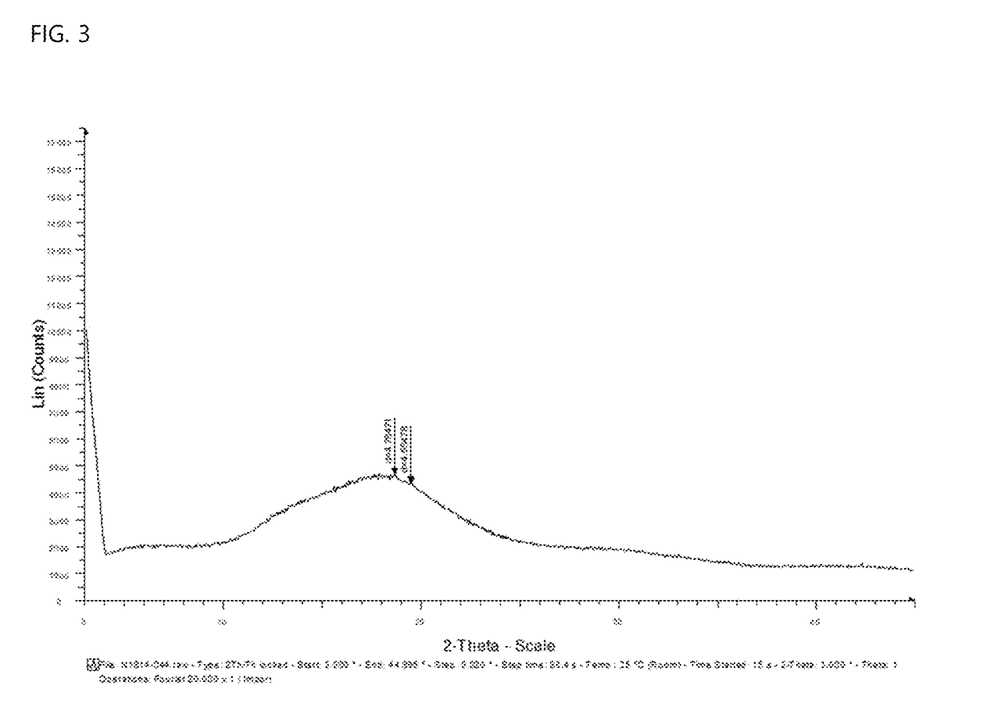
FIG. 3 illustrates XRD data of the compound of Chemical Formula 2.

13C NMR (DMSO d6) 171.85, 157.18, 141.11, 137.27, 133.48, 128.45, 128.29, 126.73, 124.68, 124.39, 114.64, 105.44, 80.58, 78.16, 69.14, 63.84, 63.52, 59.88, 59.27, 42.81, 34.72, 32.70, 27.91, 25.45, 3.14 ppm Absorption spectrum (FT-IR, KBr): 2912 $cm^{-1}$, 1706.14 $cm^{-1}$, 1508.03 $cm^{-1}$, 1111.62 $cm^{-1}$ Furthermore, XRD and DSC/TGA were analyzed, and the results are shown in FIGS. 2 and 3, respectively. XRD and DSC/TGA analysis conditions are as follows. It was confirmed that the synthesized substance was amorphous.

<Xrd Conditions>
Model: D8 Advance (Bruker)
Power: 40 mA, 40 kV,
Time range: 3 min to 45 min (6 deg/min*3)
<DSC/TGA Conditions>
Model: TGA Q5000 IR/SDT Q600 (TA)
Temperature range: 40° C. to 600° C.
Rate: 20° C.

Figure 4:
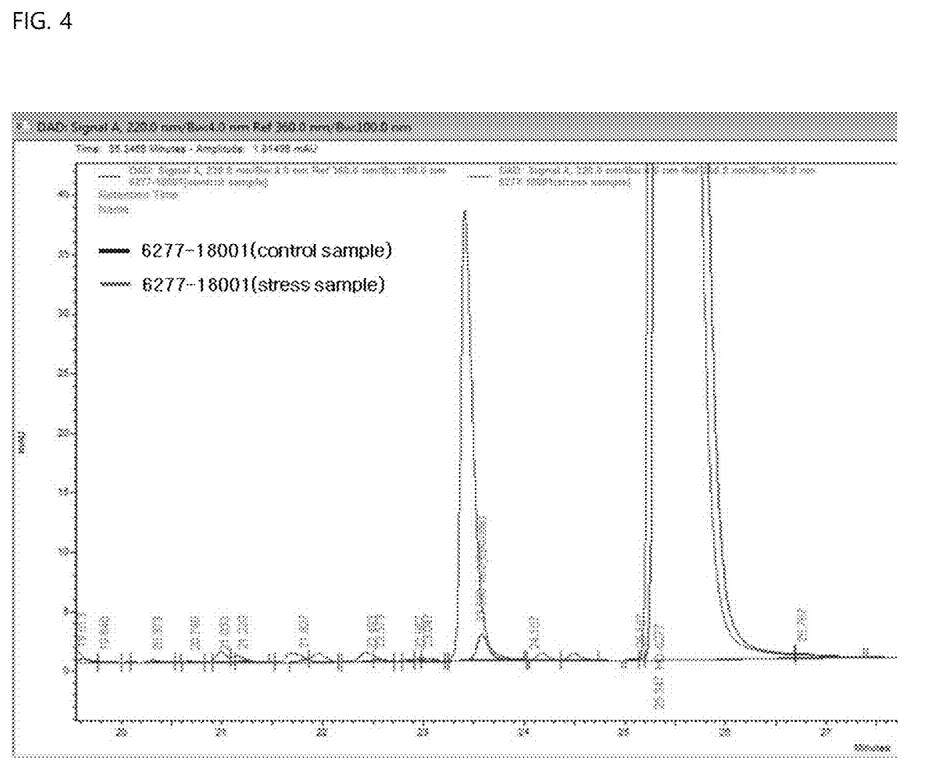
FIG. 4 illustrates a comparison of the HPLC analysis results of a control and a stress sample. In the drawing, blue indicates the control and green indicates the stress sample.

Example 3: Confirmation of Compound of Chemical Formula 2 as Related Substance A stress sample stressed using an oxidant was prepared to confirm the production of the related substance. About 35 mg of a (3S)-3-(4-(3-(1,4-dioxaspiro[4,5]dec-7-en-8-yl)benzyloxy)phenyl)hex-4-inoic acid-containing substance stored under refrigerated conditions (5° C.±3° C.) for about 2 years was accurately weighed and put into a 50-ml volume flask. A diluent was added to the flask at about ⅔ of the volume, and the resulting mixture was mixed well. After 2 ml of a 3% hydrogen peroxide solution was added thereto, the resulting mixture was mixed well and marked with a diluent. The stress sample was left to stand at room temperature, and 24 hours later, the related substance was analyzed using HPLC (Agilent Technologies 1200 Series). The related substance was analyzed under the same conditions as in Example 1. As a result, it was confirmed that the related substance was produced from the stress sample (RRT 0.93, Area 3.83%). A comparison of the HPLC data of both samples using the sample of Example 1 as a control is shown in FIG. 4 (blue: control, green: stress sample). It was confirmed that the production of the related substance of Chemical Formula 2 in the stress sample was increased compared to the control.

The invention claimed is:

1. A composition for evaluating a pharmaceutical product comprising (3S)-3-(4-(3-(1,4-dioxaspiro[4,5]dec-7-en-8-yl)benzyloxy)phenyl)hex-4-inoic acid, comprising a compound of the following Chemical Formula 2 or a salt thereof

[Chemical Formula 2]

2. A method for evaluating the quality of a pharmaceutical product comprising (3S)-3-(4-(3-(1,4-dioxaspiro[4,5]dec-7-en-8-yl)benzyloxy)phenyl)hex-4-inoic acid, the method comprising evaluating a content of (3S)-3-(4-(3-(1,4-dioxaspiro[4,5]dec-7-en-8-yl)benzyloxy)phenyl)hex-4-inoic acid in the pharmaceutical product using a compound of the following Chemical Formula 2 or a salt thereof as a reference standard

[Chemical Formula 2]

3. A method for evaluating the quality of a pharmaceutical product comprising (3S)-3-(4-(3-(1,4-dioxaspiro[4,5] dec-7-en-8-yl)benzyloxy)phenyl)hex-4-inoic acid, the method comprising evaluating a content of a related substance in the pharmaceutical product using a compound of the following Chemical Formula 2 or a salt thereof as a reference standard

[Chemical Formula 2]

4. A method for analyzing a sample comprising (3S)-3-(4-(3-(1,4-dioxaspiro[4,5]dec-7-en-yl)benzyloxy)phenyl)hex-4-inoic acid, the method comprising:
 a) obtaining data by subjecting a sample to chromatography; and
 b) comparing the data with the chromatography data of a compound of the following Chemical Formula 2 or a salt thereof

[Chemical Formula 2]

5. The method of claim 4, wherein the method comprises:
(a) obtaining a chromatogram by subjecting a solution of (3S)-3-(4-(3-(1,4-dioxaspiro[4,5]dec-7-en-8-yl)benzyloxy)phenyl)hex-4-inoic acid comprising the compound of Chemical Formula 2 or a salt thereof to high-performance liquid chromatography; and
(b) comparing a peak obtained from the chromatogram with a peak produced from the compound of Chemical Formula 2 or a salt thereof.

6. The method of claim 4, wherein the method comprises:
(a) obtaining a chromatogram by subjecting a solution of (3S)-3-(4-(3-(1,4-dioxaspiro[4,5]dec-7-en-8-yl)benzyloxy)phenyl)hex-4-inoic acid to thin layer chromatography; and
(b) comparing a spot obtained from the chromatogram with a spot produced from the compound of Chemical Formula 2 or a salt thereof.

7. A method for measuring a chromatography column retention time for (3S) (4-(3-(1,4-dioxaspiro[4,5]dec-7-en-8-yl)benzyloxy)phenyl)hex-4-inoic acid, the method comprising:
 performing chromatography using a compound of the following Chemical Formula 2 or a salt thereof as a reference standard

[Chemical Formula 2]

8. A compound of the following Chemical Formula 2 or a salt thereof:

[Chemical Formula 2]

* * * * *